# United States Patent Office 2,904,519
Patented Sept. 15, 1959

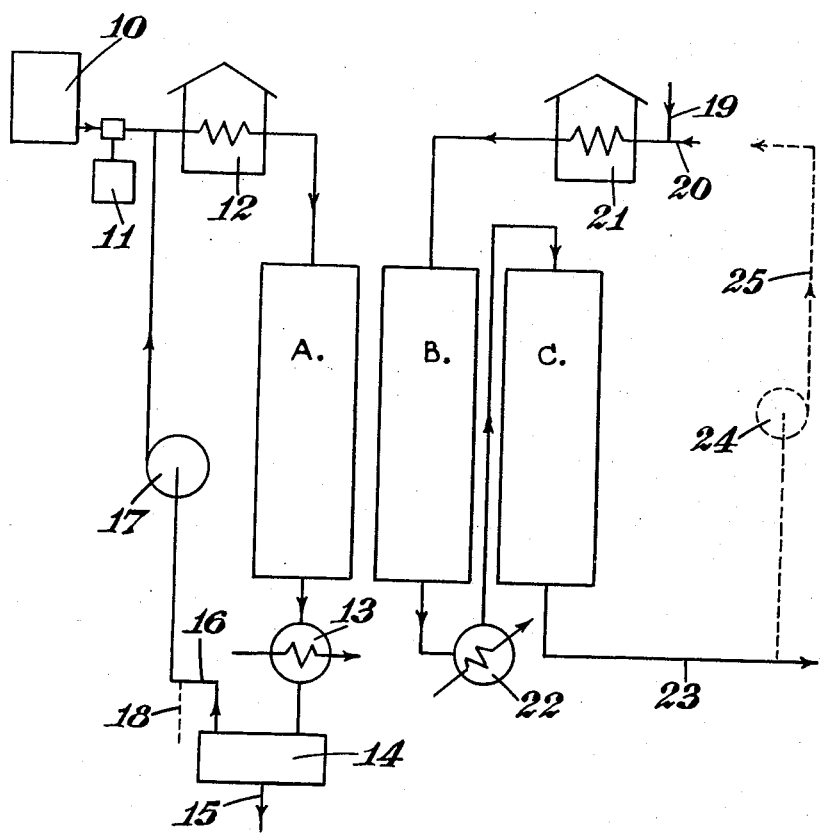

2,904,519

CATALYST REGENERATION

Albert Edward Cornfield and Leslie Benjamin Witten, Sunbury-on-Thames, England, assignors to The British Petroleum Company Limited Application October 14, 1953, Serial No. 385,922

Claims priority, application Great Britain October 17, 1952

4 Claims. (Cl. 252—420)

This invention relates to catalytic processes using catalysts containing aluminum and fluorine.

For example, in the so-called autofining process for the hydrocatalytic desulphurisation of petroleum hydrocarbons catalysts may be used comprising a minor amount of fluorine within the range 0.1 to 6.0% wt., and the oxides of cobalt and molybdenum supported on activated alumina all as described in the specification of co-pending United States application Ser. No. 311,429, filed September 25, 1952, now Patent No. 2,800,429. Presumably, even probably, but not inevitably, the aluminium and fluorine are present as aluminium fluoride. It has been found, however, that such fluorinated catalysts tend to lose fluorine during the regeneration of the catalyst when it is subjected to temperatures of the order of 1100° F. in the presence of steam.

It is known that the so-called carbonaceous deposit formed on catalysts during the hydrocatalytic desulphurisation process consists in fact of high-boiling hydrocarbons. The purpose of the regeneration step is to burn off these hydrocarbons which impair the activity of the catalyst. Such regeneration may be effected by heating the catalyst at an elevated temperature with steam and air, in which case steam is obviously present. Alternatively, regeneration may be effected by inert gas and air at elevated temperature, but in this case steam is also present since on combustion the hydrocarbonaceous deposit yields steam and carbon dioxide. Either method of regeneration involved the presence of steam.

It is an observed fact that during regeneration, the temperature of which is determined by the necessity to burn off the hydrocarbonaceous deposit, hydrogen fluoride is evolved and is found in the regeneration gases. The precise mechanism by which the hydrogen fluoride is formed is not known, but assuming that the aluminium and fluorine are present as aluminium fluoride the steam probably reacts with the aluminium fluoride to form hydrogen fluoride. It is known that hydrolysis of aluminium fluoride takes place at the regeneration temperature. It is believed that such loss of fluorine is due to the hydrolysis of the aluminium fluoride in the catalyst by the steam, the resulting hydrogen fluoride being carried away with the the regeneration gases.

A process has now been developed for the regeneration of catalysts containing aluminium and fluorine by means of which this loss of fluorine arising when the catalyst inevitably though undesirably comes into contact with gases containing steam, may be substantially reduced.

According to the invention, in a process for the regeneration of a catalyst containing aluminium and fluorine in which the catalyst comes into contact with gases containing steam at a temperature at which aluminium fluoride is hydrolysed with the formation of hydrogen fluoride, the exit gases from each regeneration are passed over a catalyst mass containing aluminium but containing no fluorine or having a fluorine content below the desired content in the catalyst, at a temperature low enough to cause the hydrogen fluoride in the regeneration gases to be taken up by the catalyst mass, until the fluorine content of the catalyst mass has reached a value at which the catalyst mass is satisfactory for use in the catalytic process.

By operating the catalytic process with a plurality of reactors, one of which is always in use for the recovery of hydrogen fluoride from the regeneration gases, it is possible to operate the catalytic process continuously with the minimum loss of fluorine.

The exit gases from the regeneration stage are advantageously cooled to a temperature of between 200 and 700° F. before being passed over the catalyst mass.

The application of the process of the invention to the autofining process will now be described with reference to the accompanying flow diagram.

The system illustrated comprises three reactors A, B and C. At the start of the process, reactors A and B contain catalyst containing aluminium and fluorine and reactor C contains a similar catalyst having no fluorine or a fluorine content below the desired content in the catalyst. Reactors A and B are used alternately for processing the feedstock and when each is being regenerated the exit gases are cooled to a temperature of between 200 and 700° F. and passed to the reactor C where the hydrogen fluoride in the regeneration gases is taken up by the fluorine-deficient catalyst. This process is continued until the mean fluorine content of the catalyst in the reactor C has reached the upper limit to an amount of fluorine desired in the catalyst or the mean fluorine content of the catalyst in either of the reactors A and B has reached the lower limit to an amount of fluorine desired in the catalyst, whereupon the reactor C is brought on-stream and either of the on-stream reactors A and B after regeneration, is used for the recovery of fluorine as described with respect to reactor C.

The process and regeneration systems are of conventional arrangement. Thus the feedstock to be treated is fed from tank 10 by means of pump 11 to heater 12 from which it passes to reactor A. The products from reactor A are passed through cooler 13 to a high pressure separator 14 from which liquid product containing hydrogen sulphide in solution is removed via line 15. A hydrogen-rich gas is removed from the separator 14 via line 16 and recycled by means of gas booster 17 into admixture with the fresh feed, any excess gas being withdrawn via line 18.

During regeneration, air is admitted via line 19 and inert gas via line 20, and the mixture of air and inert gas is passed through heater 21 and thence through reactor B containing the catalyst mass to be regenerated. Since the so-called cabonaceous deposit which is formed on the catalyst during the hydrocatalytic desulphurisation process and which is to be removed, consists in fact of high boiling hydrocarbons, the temperature of the mixture of air and inert gas entering the reactor B has to be sufficiently high to burn off these hydrocarbons which impair the activity of the catalyst. On combustion, the hydrocarbonaceous deposit yields steam and carbon dioxide. At the regeneration temperature, hydrolysis of the aluminium fluoride takes place with the formation of hydrogen fluoride. The gases leaving reactor B and containing any hydrogen fluoride formed by hydrolysis of the aluminium fluoride in the catalyst are passed through cooler 22 to reactor C and thence via line 23 to vent. If desired, part or all of the gases from line 23 may be recycled to the reactor B by means of gas booster 24 and line 25.

Any overall loss of fluorine from the system may be made up by any of the methods described in the specifications of the co-pending British application No. 30049/52, now Patent No. 747,663.

We claim:

1. In a process for the regeneration of a catalyst comprising oxides of cobalt and molybdenum supported upon alumina and containing a minor amount of fluorine within the range 0.1 to 6.0% wt., in which process the catalyst comes into contact with steam in a regeneration stage, at a suitable regeneration temperature above 700° F., and hydrogen fluoride is formed, and in which the hydrogen fluoride formed is carried away in the exit gases from said stage, the steps comprising passing the exit gases from the regeneration stage while they still contain the hydrogen fluoride, over a catalyst mass comprising oxides of cobalt and molybdenum supported upon alumina but containing no fluorine, at a temperature of between 200° and 700° F. to cause the hydrogen fluoride in said gases to be taken up by the catalyst mass, and continuing the passage of said gases until the fluorine content of the catalyst mass has reached said minor amount.

2. In a process for the regeneration of a catalyst comprising oxides of cobalt and molybdenum supported upon alumina and containing a minor amount of fluorine within the range 0.1 to 6.0% wt., in which process the catalyst comes into contact with steam in a regeneration stage, at a suitable regeneration temperature above 700° F., and hydrogen fluoride is formed, and in which the hydrogen fluoride formed is carried away in the exit gases from said stage, the steps comprising passing the exit gases from the regeneration stage while they still contain the hydrogen fluoride, over a catalyst mass comprising oxides of cobalt and molybdenum supported upon alumina but containing an amount of fluorine, if any, less than said minor amount, at a temperature of between 200° and 700° F. to cause hydrogen fluoride in said gases to be taken up by the catalyst mass, and continuing the passage of said gases until the fluorine content of the catalyst mass has reached said minor amount.

3. In a process for the regeneration of a catalyst comprising oxides of cobalt and molybdenum supported upon alumina and containing a minor amount of fluorine within the range 0.1 to 6.0% wt., in which the catalyst comes into contact with steam in a regeneration stage, at a suitable regeneration temperature above 700° F., and hydrogen fluoride is formed, and in which the hydrogen fluoride formed is carried away in the exit gases from said stage, the steps comprising cooling the exit gases from the regeneration stage to a temperature of between 200 and 700° F., passing the cooled gases at said temperature and while they still contain the hydrogen fluoride, over a catalyst mass comprising oxides of cobalt and molybdenum supported upon alumina but containing no fluorine, so that hydrogen fluoride in the regeneration gases is taken up by the catalyst mass, and continuing the passage of said gases until the fluorine content of the catalyst mass has reached said minor amount.

4. In a process for the regeneration of a catalyst comprising oxides of cobalt and molybdenum supported upon alumina and containing a minor amount of fluorine within the range 0.1 to 6.0% wt., in which the catalyst comes into contact with steam in a regeneration stage, at a suitable regeneration temperature above 700° F., and hydrogen fluoride is formed, and in which the hydrogen fluoride formed is carried away in the exit gases from said stage, the steps comprising cooling the exit gases from the regeneration stage to a temperature of between 200 and 700° F., passing the cooled gases at said temperature and while they still contain the hydrogen fluoride, over a catalyst mass comprising oxides of cobalt and molybdenum supported upon alumina but containing an amount of fluorine, if any, less than said minor amount, so that the hydrogen fluoride in the cooled gases is taken up by the catalyst mass, and continuing the passage of said gases until the fluorine content of the catalyst mass has reached said minor amount.

References Cited in the file of this patent

UNITED STATES PATENTS

| | | |
|---|---|---|
| 2,031,600 | Harrison et al. | Feb. 25, 1936 |
| 2,339,685 | De Simo et al. | Jan. 18, 1944 |
| 2,487,466 | Nahin | Nov. 8, 1949 |
| 2,487,717 | Maker et al. | Nov. 8, 1949 |
| 2,551,145 | Loy | May 1, 1951 |
| 2,580,004 | Corneil | Dec. 25, 1951 |
| 2,642,384 | Cox | June 16, 1953 |